United States Patent [19]
Kinne

[11] Patent Number: 4,576,398
[45] Date of Patent: Mar. 18, 1986

[54] TRAILER FRAME STRUCTURE

[75] Inventor: Stanley F. Kinne, Portland, Oreg.

[73] Assignee: Lear Siegler, Inc., Santa Monica, Calif.

[21] Appl. No.: 642,490

[22] Filed: Aug. 20, 1984

[51] Int. Cl.[4] .......................................... B62D 63/06
[52] U.S. Cl. ................................................. 280/789
[58] Field of Search ...................................... 280/789

[56] References Cited

U.S. PATENT DOCUMENTS

| | | | |
|---|---|---|---|
| 2,861,811 | 11/1958 | Lassen | 280/789 |
| 2,912,253 | 10/1959 | Harris et al. | 280/789 |
| 3,082,039 | 3/1963 | Clement | 298/17 R |
| 3,193,330 | 7/1965 | Hribar, Jr. | 298/8 R |
| 3,310,345 | 3/1967 | Rowden | 298/35 M |
| 3,771,829 | 11/1973 | Breazeale et al. | 298/17 R |
| 4,049,285 | 9/1977 | Chieger | 280/789 |
| 4,289,353 | 9/1981 | Merritt | 298/17.5 |

FOREIGN PATENT DOCUMENTS

| | | | |
|---|---|---|---|
| 2702243 | 8/1978 | Fed. Rep. of Germany | 280/789 |
| 1122388 | 9/1956 | France . | |
| 1228906 | 9/1960 | France | 280/789 |
| 80328 | 6/1952 | Norway | 280/789 |

Primary Examiner—John J. Love
Assistant Examiner—Kenneth R. Rice
Attorney, Agent, or Firm—David L. Garrison

[57] ABSTRACT

A trailer frame structure of substantially side by side longitudinally extending generally gable shaped solid web truss members which generally incline upwardly from a hitch to a body supporting rear portion while diverging toward the rear portion. The rear portion has an upper support surface substantially parallel to the ground to receive a dump body or other load. The gable shape of the frame provides increased strength at a high stress location to resist breakage and cracking under high loads.

8 Claims, 5 Drawing Figures

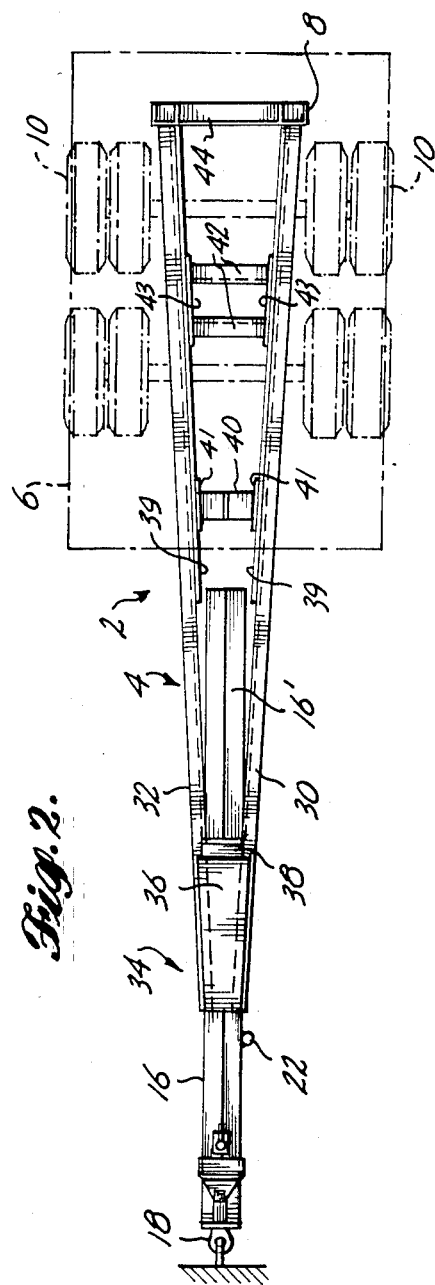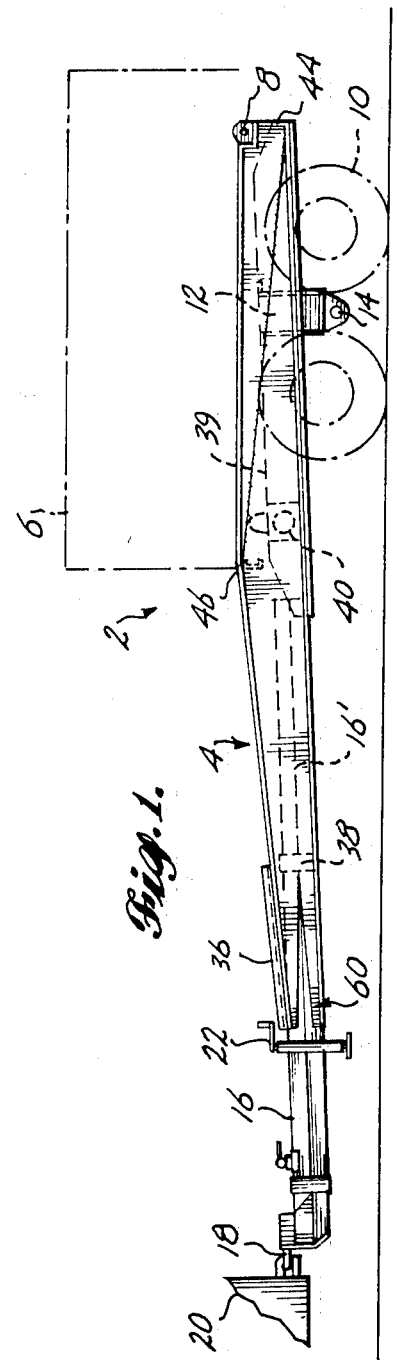

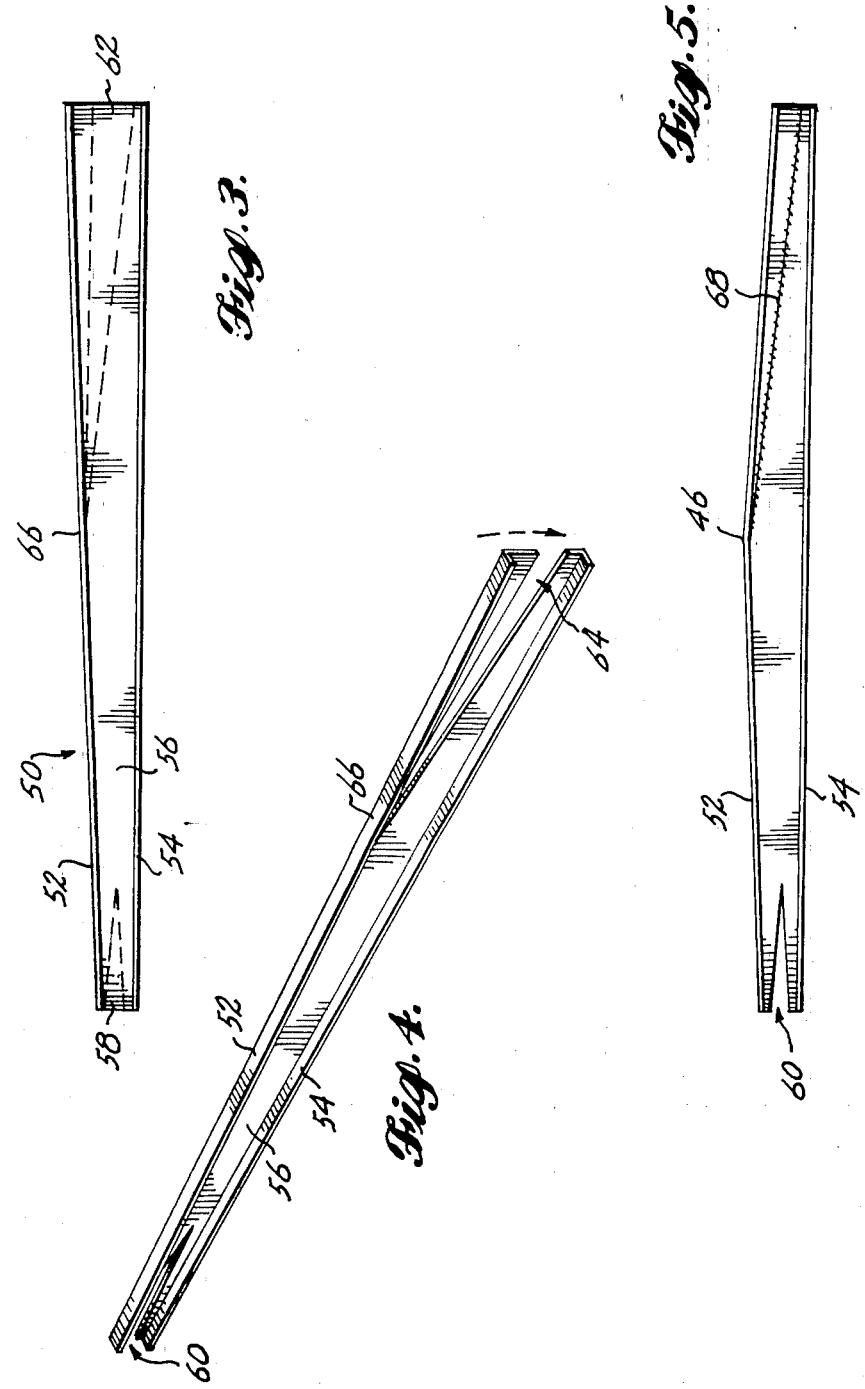

4,576,398

TRAILER FRAME STRUCTURE

BACKGROUND OF THE INVENTION

The present invention relates to an improved trailer unit having a breakage resistant frame construction of enhanced strength. The trailer unit is particularly well adapted for carrying concentrated heavy loads such as construction rock.

Trailers for carrying extremely heavy materials have been available for a long period of time. These are generally constructed in one of two ways. Either the load is concentrated over a single double axle wheel unit or the body is constructed so as to distribute the load between two relatively closely spaced double axle wheel units. The dual rear axle of a truck or tractor may or may not serve as the forward wheel set. A vehicle of the second type is shown in U.S. Pat. No. 2,912,253, to Harris et al. This is an example of a trailer designed to support a heavy load between the front and rear axles of a trailer unit. In this case, a trailer frame in the form of an inverted gable-type truss serves to prevent deflection at the midpoint of the trailer bed. U.S. Pat. No. 4,289,353, to Merritt, is a somewhat similar example in which the rear wheels of a tractor form the forward load carrying wheels of the trailer. U.S. Pat. No. 3,310,345, to Rowden, employs a load suspension plan similar to that of Merritt. With the exception of the Harris et al. trailer, all of the aforementioned units are designed for relatively high attachment to the prime mover through the well known "fifth wheel" type of coupling.

In the case of trailers designed for carrying heavy construction rock, rubble or dirt, a very low coupling point is usually desirable. This is necessitated because the prime mover itself normally carries a dump body and clearance must be provided above the trailer tongue for the tailgate to swing open when the load is dumped. The patent to Breazeale et al., U.S. Pat. No. 3,771,829, shows one example of how this problem can be accommodated. The Breazeale et al. frame is inclined from a low hitch point to a higher load supporting point. The trailer dump body itself is equipped with two wedge-shaped filler pieces so that it assumes a horizontal attitude when resting on the frame members. The frame of the Breazeale et al. trailer consists of two conventional pieces of channel iron which diverge from an apex point.

A somewhat similar arrangement is shown in French Pat. No. 1,122,388. Here, the front of the trailer is supported on a simple post attached to a cross member on the sloping frame.

Hribar, in U.S. Pat. No. 3,193,330 supports the dump body on a conventional frame which is tied to the prime mover by a truss formed as a three-sided pyramid. A similar arrangement is shown in U.S. Pat. No. 3,082,039, to Clement.

Trailers of the type described usually have a long tongue or other means for separating them widely from the prime mover. This is done in order to minimize weight concentration on the highways. The long coupling mechanism introduces another problem, however. Because of the great distance from the support point at the coupling, the bending moment acting on the frame at the forward end of the load can be very severe. This induces a high stress concentration which has been a frequent cause of frame breakage.

The present invention has overcome the above problem by using an improved frame design which resists deflection at high stress concentration points yet is accommodative of the required low coupling position to the print mover. Further it allows the load carrying body to bear directly on the frame without the use of filler pieces or similar supports.

SUMMARY OF THE INVENTION

The present invention is a trailer unit having an improved frame construction. The frame is comprised of a pair of substantially side-by-side, longitudinally extending, generally gable-shaped solid web truss members. By gable-shaped is means of triangular form as seen in elevation view. These members diverge laterally in V-shaped fashion from an apex zone at the proximal end. The members generally incline upwardly from a relatively lower level adjacent to the apex zone to a relatively higher level which forms a body supporting rear portion. The inclined gable construction enables this rear portion to have an upper surface essentially parallel to the ground. Appropriate cross braces bridge the longitudinal truss member to ensure stability of the structure and are connected to the truss members at reinforced locations to spread stress loads.

The body supported by the rear portion of the frame has its forward edge located near the gable peak of the truss members. By virtue of its truss construction the frame is thereby better enabled to withstand the high bending forces which occur at this point. The rear portion of the frame is supported on conventional dual wheels which are essentially centered under the body. An extendable hitch mechanism located at the apex of the frame completes the unit. While the unit will normally have a dump-type body pivotally attached at the distal end of the frame, other types of bodies are equally suitable.

The inclined gable truss construction enables the floor of the load carrying body to be maintained in a position substantially parallel to the ground without the use of additional filler pieces or braces while the lower flange member of the trusses as inclined upwardly from the apex toward the rear of the frame.

It is an object of the present invention to provide a trailer having an improved frame construction.

It is another object to provide a trailer with a frame resistant to deflection and breakage at high stress points.

It is a further object to provide a trailer with an improved frame which can be easily fabricated from readily available materials.

These and many other objects will become immediately apparent to those skilled in the art upon reading the following detailed description taken in conjunction with the drawings.

BRIEF DESCRIPTION OF THE DRAWINGS

FIG. 1 is a side elevation of the unit in which the conventional wheels and body portion are shown in ghost form.

FIG. 2 is a top plan view of the unit.

FIGS. 3–5 show a preferred method of construction of the gable-shaped trusses.

DESCRIPTION OF THE PREFERRED EMBODIMENTS

Referring now to the drawings, FIGS. 1 and 2 show a trailer unit, generally indicated at 2, comprising a frame portion 4 and a body portion 6. In the embodiment shown, body 6 is pivotally attached to the distal end of frame 4 at pivot 8. A conventional dual axle wheel unit 10 is coupled to the frame by structural member 12 and attachment point 14.

In a preferred embodiment, a telescoping tongue member 16 enters the frame at the apex zone 34. The distal end 16' of the tongue is enclosed within the space between the frame members. The tongue is equipped at its proximal end with a conventional hitch or coupling 18 which acts with a cooperating portion attached to prime mover 20, shown here in fragmentary form.

Looking more specifically at the construction of the frame, it is comprised of a first truss member 30 and a second truss member 32 which is generally formed as a mirror image of the first truss member 30. These truss members are united at an apex zone at the proximal end of the frame where they are strengthened by a gusset 36. Frame liners 39 extend along the loaded portion of the frame and enhance the strength thereof. Bridging cross members 38, 40, 42 and 44 rigidly unite the two trusses. Gussets 41 and 43 further strengthen the frame structure and spread stress over a larger area to prevent breakage of the frame at the structural interface between the truss members and the cross members. Cross member 38 further serves as a bearing to add rigidity to tongue member 16.

As seen in FIGS. 3-5, truss members 30 and 32, viewed in side elevation, are seen to be of gable form having slightly truncated ends. Each of of channel shaped cross section with a solid web member 56, an upper flange member 52, and a lower flange member 54. The flanges form the chord sections of the completed truss. A gable peak 46 marks the deepest part of the web section.

The truss members can be relatively simply formed as is shown in FIGS. 3 through 5. The basic structural member is a length of tapered channel iron 50. As shown in FIG. 3, wedge shaped area 62 is marked out and removed to form a cutout 64. Optionally, depending on the size and cross sectional nature of tongue 16, area 58 may be removed from the proximal end to form cutout 60. After cutout 64 is formed, the upper portion is bent downwardly at 66 until the web portions again meet. The now adjacent web edges are welded to again form a completely rigid structure having the form shown in FIG. 5.

Portions of solid web member 56 may be removed to decrease the weight of the truss structure if desired.

As an alternative form of construction, the truss members can be fabricated to have other types of cross section; e.g. sections representing I-beams or H-beams. However, the channel construction is preferred because of its great simplicity and fully adequate strength.

The gable-shaped truss has two particular advantages. When used in the inclined fashion shown in FIG. 1, it enables the trailer body to be carried level and bear directly on the frame without the need for other means of adjustment. It also provides the greatest resistance to bending at the point of maximum stress concentration.

It will be evident to those skilled in the art that many variations can be made in the trailer unit described without departing from the spirit of the invention. The scope of the invention should be considered as limited only by the following claims.

What is claimed is:

1. A trailer unit which comprises:
   a. a frame comprising a pair of substantially side-by-side longitudinally extending, generally gable-shaped solid web truss members, said members diverging laterally in V-shaped fashion from a proximal end apex zone to a distal end, lower flanges of said truss members being inclined from a lower level adjacent to the apex zone to a relatively higher wheel means engaging level, said web truss members having a body supporting rear portion with an upper flange member substantially parallel to the ground, whereby the web of said rear portion increases in vertical dimension from said distal end to a gable peak, and said web truss members further having a converging portion extending forwardly from said gable peak whereby the web of said converging portion decreases in vertical dimension from said gable peak toward said apex, said longitudinal members being cross-braced by at least one transverse bridging member;
   b. a body supported by the rear portion of the frame with the forward portion of the body located adjacent to the gable peak of the truss members;
   c. wheel means supporting the rear portion of the frame; and
   d. hitch means located at the apex zone of the frame.

2. The trailer unit of claim 1 in which the body is a dump body pivotally attached to the distal end of the frame.

3. The trailer unit of claim 1 in which the longitudinal truss members are of channel-shaped cross section.

4. The trailer unit of claim 3 in which the gable form is created by cutting out a wedge-shaped longitudinal area from the web section at the distal end of the channel members, bending the flange portions adjacent to the cut out areas toward each other until the remaining web portion adjoin, and welding the adjoining web portions.

5. The trailer unit of claim 4 in which the channel members are originally of tapered form with the narrowest web section at the proximal end and the cut out portion at the distal end.

6. The trailer unit of claim 1 which the hitch means further includes a telescoping tongue means entering the frame at the apex zone.

7. The trailer unit of claim 6 including proximal end cutout portions in the web section of the truss members to accomodate the tongue means.

8. The trailer unit of claim 1 wherein said transverse bridging member is attached to said longitudinal members using a stress spreading gusset to reinforce the structural interface between the longitudnal member and the bridging member.

* * * * *